United States Patent Office 2,764,592
Patented Sept. 25, 1956

2,764,592

ADDUCTS OF MERCAPTANS AND ISOCYANATES

Nelson V. Seeger, Silver Lake, Cuyahoga Falls, and Thomas G. Mastin, Akron, Ohio, assignors, by mesne assignments, to The Goodyear Tire & Rubber Company, a corporation of Ohio No Drawing. Application November 5, 1952,
Serial No. 318,949

1 Claim. (Cl. 260—306.6)

This invention relates to new compositions of matter and to a method for preparing the same. More particularly, it relates to mono (thiourethane) substituted organic isocyanates and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055 and Serial No. 170,056, filed June 23, 1950, both now abandoned. According to the present invention, a means is provided for controlling the reactivity of polyisocyanates.

The broad object of this invention is to provide a new class of chemical compounds from organic polyisocyanates and mercaptans. It is a particular object to provide a new class of chemical compounds some of which are useful as delayed-action curing or cross-linking agents for diisocyanate-modified polyesters and polyesteramides. It is another object of this invention to provide as new compositions of matter the mono-adducts of polyisocyanates and mercaptans resulting from the reaction of approximately equal molecular proportions thereof. A specific object is to prepare the mono-adducts of polyisocyanates and mercaptans in which the reactivity of the poly-functional character of the polyisocyanate may be controlled.

A convenient method for the preparation of the new compounds to which this invention relates may be represented by the following equation:

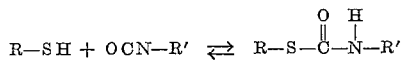

in which R is an organic radical containing no groups reactive with an isocyanate group and R' is an organic radical containing at least one isocyanate group and no groups reactive with the isocyanate group. The particular isocyanate radical to which the mercaptan group attaches is not important since the mono-adducts formed are useful in the control of the polyfunctional reactivity of the polyisocyanate without regard to the particular position of attachment of the blocking group. The thiol group present in the mercaptan reactant should be the only group present in either the mercaptan or polyisocyanate which contains a reactive hydrogen atom. The presence of reactive hydrogen is determined by the Zerewitinoff method as described in J. Am. Chem. Soc. 49, 3181 (1927). The presence of groups other than the thiol group of the mercaptan which contain reactive hydrogen permits polymerization reactions, which are not desired.

It will be noted that the reaction between the polyisocyanate and the mercaptan is a reversible reaction, the direction of which may be controlled by temperature. Thus, the mono-adduct of the polyisocyanate and the mercaptan is formed at relatively low temperatures while the formed mono-adduct dissociates into the polyisocyanate and the mercaptan at relatively high temperatures, for instance, in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used provided only that the polyisocyanate is free of groups reactive with the isocyanate radical, such as hydroxyl, carboxyl, primary or secondary amino groups. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4 and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanate triphenyl methane, 1,3,5-triisocyanto benzene, and 2,4,6-triisocyanto toluene; and the tetraisocyanates such as 4,4'-dimethyldiphenyl methane 2,2', 5,5' tetraisocyanate.

Any mercaptan in which the thiol group is the only group containing reactive hydrogen may be used in the formation of the mono-adducts. Representative examples are 2-mercaptobenzothiazole, 2-mercapto thiazoline, dodecyl mercaptan, ethyl-2-mercapto thiazole, dimethyl-2-mercapto thiazole, beta naphthyl mercaptan, alpha naphthyl mercaptan, phenyl-2-mercapto thiazole, methyl mercaptan, ethyl mercaptan, propyl mercaptan, butyl mercaptan, and ethinyl dimethyl thiocarbinol.

Certain preferred mono-adducts are those resulting from the reaction of a mercaptan and any one of the following:

1. 4,4'-diphenyl diisocyanate
2. 2,4-tolylene diisocyanate
3. 1,5-naphthalene diisocyanate
4. 4,4'-diphenylene methane diisocyanate Specific mono-adducts which are preferred are those resulting from the reaction of:

1. 2-mercaptobenzothiazole and 4,4'-diphenyl diisocyanate
2. 2-mercaptobenzothiazole and 2,4-tolylene diisocyanate
3. 2-mercaptobenzothiazole and 1,5-naphthalene diisocyanate
4. 2-mercaptobenzothiazole and 4,4'-diphenylene methane diisocyanate In the preparation of the mono-adducts in general, the polyisocyanate and the mercaptan are usually dissolved in a suitable inert solvent such as toluene, methyl ethyl ketone, or o-dichlorobenzene. The solutions are stirred together and permitted to stand. The reaction should be caused to take place at a temperature below the decomposition temperature of the desired product, and preferably at a temperature not exceeding approximately 100° C. In most instances the reaction will proceed satisfactorily at room temperature. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided to insure that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of mono (thiourethane) substituted organic isocyanates is illustrated by the following example which is to be interpreted as representative rather than restrictive of the scope of this invention.

*Example*

Mercaptobenzothiazole (83.5 grams) was dissolved in 600 cubic centimeters of methyl ethyl ketone, and 4,4'-diphenyl diisocyanate (177 grams) was dissolved in one liter of methyl ethyl ketone. The solutions were poured together and an additional 400 cubic centimeters of methyl ethyl ketone was added. The solution was permitted to stand at room temperature. A light tan solid separated from solution, was removed by filtering, and dried. The yield of the first and second-crop separation was 100 grams of the mono-adduct.

Any of the mercaptans set forth above may be reacted with any of the mentioned polyisocyanates in accordance with the procedure described in the foregoing example to obtain mono-adducts of the desired type.

This application is a continuation-in-part of our co-pending application Serial No. 193,516, filed November 1, 1950, now abandoned.

While certain representative embodiments and details have been shown for the purpose of illustrating the invention, it will be apparent to those skilled in this art that various changes and modifications may be made therein without departing from the spirit or scope of the invention.

We claim:

As new compositions of matter the mono (thiourethane) substituted organic isocyanates defined by the formula:

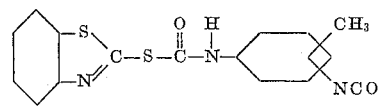

References Cited in the file of this patent

UNITED STATES PATENTS

| | | |
|---|---|---|
| 2,284,896 | Hanford et al. | June 2, 1942 |
| 2,340,757 | Kaase et al. | Feb. 1, 1944 |